United States Patent [19]

Ring et al.

[11] 3,893,185

[45] July 1, 1975

[54] FLUID BIASED HEAD ASSEMBLY

[76] Inventors: John J. Ring, 26251 Morena Dr., Mission Viejo, Calif. 92675; William R. Miller, 3301 Yarba Linda Blvd. No. 202, Fullerton, Calif. 92631

[22] Filed: July 16, 1973

[21] Appl. No.: 379,236

[52] U.S. Cl. .......... 360/103; 340/174.15

[51] Int. Cl. .......... G11b 5/00

[58] Field of Search .......... 360/102, 103, 97

[56] References Cited

UNITED STATES PATENTS

| | | | |
|---|---|---|---|
| 2,928,709 | 3/1960 | Baomeister | 340/174.1 E |
| 3,123,677 | 3/1964 | Leuxen et al. | 340/174.1 E |
| 3,213,461 | 9/1965 | Goddard | 340/174.1 E |
| 3,303,485 | 2/1967 | Lee | 340/174.1 E |
| 3,435,441 | 3/1969 | Stahler | 340/174.1 E |
| 3,676,874 | 7/1972 | Turner | 340/174.1 E |
| 3,678,216 | 7/1972 | Rousso, Jr. et al. | 340/174.1 E |
| 3,737,880 | 6/1973 | Kelly | 340/174.1 E |

*Primary Examiner*—Vincent P. Canney
*Attorney, Agent, or Firm*—Richard L. Myers

[57] ABSTRACT

A head assembly for transducing signals between a head and a recording medium includes a mechanically biased pad for pressing the medium against the head. A first fluid introduced through the head into the head/medium interface produces a first force on the medium. A second fluid introduced through the pad into the pad/medium interface produces a second, opposite force on the medium. The first force reduces the friction forces on the head while the second force maintains the medium in contiguous relationship with the head. In combination, the first and second forces pinch the medium to provide the medium with a rigid configuration. The second force also opposes the biasing force on the pad so that the pad is provided with a frictionless relationship with the medium. The pressures of the first and second fluids provide for self-cleaning of the respective interfaces.

25 Claims, 7 Drawing Figures

FLUID BIASED HEAD ASSEMBLY

BACKGROUND OF THE INVENTION

Field of the Invention

This invention relates generally to head assemblies for transducing signals between a head and a recording medium, and more specifically to the use of fluids for lubricating the interface between the head and the medium.

Magnetic heads and magnetizable media such as recording tapes and disks have been used for the storage and retrieval of both audio and video signals. Magnetic heads moving relative to the medium have been responsive to electrical signals to provide magnetic signals which have altered the magnetic characteristics of the medium. Playback heads moving relative to the medium have been responsive to the magnetic characteristics of the medium to reproduce the electrical signals.

The physical relationship between the magnetizable medium and the magnetic head has been found to be particularly critical. For example it has been found that the output signal of a head at a given wavelength is proportional to the separation distance between the head and the medium. This separation gives rise to the so-called spacing loss which is directly proportional to the separation distance and inversely proportional to the wavelength. Thus in order to minimize the spacing loss, it has been desirable to maintain the magnetic head and the medium in as close a proximity as possible.

In the interest of high frequency recording and playback, the spacing loss has been minimized by providing a contiguous relationship between the head and the medium. While this has been particularly beneficial from a reproduction point of view, this contiguous relationship has significantly shortened the useful life of both the head and the medium. For example in a typical video tape system, the head and the magnetizable medium have moved relative to each other at a velocity such as 100 inches per second. In these systems, the contiguous relationship of the head and the medium have limited the useful life of the heads to approximately 60 hours. The tapes in these video systems have worn to an extent that an intolerable loss of resolution has occurred after only three or four uses.

The contiguous relationship between the head and the medium has been enhanced by the application of tension to the medium, such as magnetic tape, as it passes the head. Contact between the head and the medium has been further enhanced by the use of pressure pads made of felt or other similar compliant material. These pads have pressed against the underside of the medium to press the medium against the head. In each case, the pressures exerted by the pad on the medium and the medium on the head have been sufficient to severely curtail the life of the elements. For this reason, such an arrangement has typically been used only in those systems wherein relative motion between the elements has been intermittent.

In an attempt to provide a compromise between the undesirable wear and spacing loss, high speed digital recording systems have been provided with flying heads or flying medium. In these systems, the laminar flow of the air adjacent to the medium has provided a pressure which has supported the weight of the head so that theoretically the head does not contact the medium. The pressure of the laminar flow has decreased with increasing distances from the medium so that the head has been maintained at a point of equilibrium typically between 20 and 100 microinches from the surface of the medium. Although such systems have significantly increased the lives of the interfacing components, they have suffered from a significant spacing loss. Such systems have also been extremely sensitive to non-homogeneous surfaces of the medium and also the dust and other extraneous particles which have been drawn into the interface between the head and the medium. These particles have scored the heads and the medium and resulted in head crashes which have destroyed both the head and the medium.

The technique for flying the head has been difficult to apply to flexible media such as "floppy disks" since the surfaces of such media have not been particularly rigid in proximity to the associated magnetic head. In this case the head is maintained in a fixed position and the disk "contours" itself to the head by reason of laminar air flow.

SUMMARY OF THE INVENTION

In the present invention, a head assembly is provided which includes a head that moves relative to a medium having first and second major surfaces. Relatively high fluid pressures are exerted upon both the first and second surfaces of the medium so that even a flexible medium is provided with a substantially rigid and constant configuration in proximity to the head. The force provided by the fluid pressure on the second side of the medium slightly exceeds the force provided by the fluid pressure on the first side of the medium. This causes the medium to be held in contiguous relationship with the head and thereby minimizes the separation distance which would otherwise give rise to a significant spacing loss. This difference in forces can be very slight so that the pressure of the medium against the head is relatively small. Friction losses which are directly proportional to this force differential are thereby held at a minimum.

In a preferred embodiment, the head is configured to introduce a fluid having a first pressure into the interface between the head and the first surface of the medium. A pad, which is mechanically biased to press against the underside of the medium, forms a second interface between the pad and the second surface of the medium. The pad is configured to introduce into the second interface a second fluid having a second pressure. In a particular embodiment, the first and second pressures may be equal in which case the areas of the respective first and second interfaces control the relative magnitudes of the forces on the respective first and second sides of the medium. If the area of the second interface is slightly greater than the area of the first interface, the force on the second side wall exceed the force on the first side so that the medium will be held in contiguous relationship with the head.

The magnitude of the second pressure and the area of the second interface can be such that the force of the fluid against the medium is slightly greater than the mechanical bias on the pad. At this point, the pad will rise from the second surface of the medium. This will have two effects. First, there will be no friction between the pad and the medium. Second, the second pressure will be reduced by leakage of the fluid between the medium and the pad. The extent of this pressure reduction and hence the extent of the force opposing the mechanical bias will provide the pad with a state of equilibrium slightly removed from the second surface of the medium.

Under dynamic conditions, the medium may tend to separate from the head. This separation will permit some of the fluid to escape from the interface and thereby result in a reduction in the first pressure. This reduced pressure will in turn result in a reduction of the first force. In an embodiment of the invention wherein the second pressure is maintained constant under these conditions, the relative magnitude of the second force with respect to the first force will increase. As a result, the medium will be forced back into contact with the head.

In a further embodiment of the invention, the second pressure is responsive to the first pressure so that under these same dynamic conditions, the second pressure is also reduced. This reduces the magnitude of the second force which opposes the mechanical bias on the pad. As a result, the mechanical bias forces the pad against the medium and the pad forces the medium back into contact with the head. In both these embodiments, the head assembly provides a bias which maintains the medium in contact with the head even under dynamic conditions.

A significant advantage is associated with the introduction of the fluid into the first interface. At the perimeters of the first interface, the fluid provides a pressure which inhibits the flow of air across the perimeters into the interface. Thus, dust and other foreign particles which heretofore have been carried into the interface are inhibited from crossing the perimeters. As a result, head crashes which have resulted in loss of information and destruction of both head and media, are significantly reduced.

These and other features and advantages of the present invention will be more apparent with a detailed description of preferred embodiments discussed with reference to the accompanying drawings.

DESCRIPTION OF THE PREFERRED EMBODIMENTS

Figure 1:
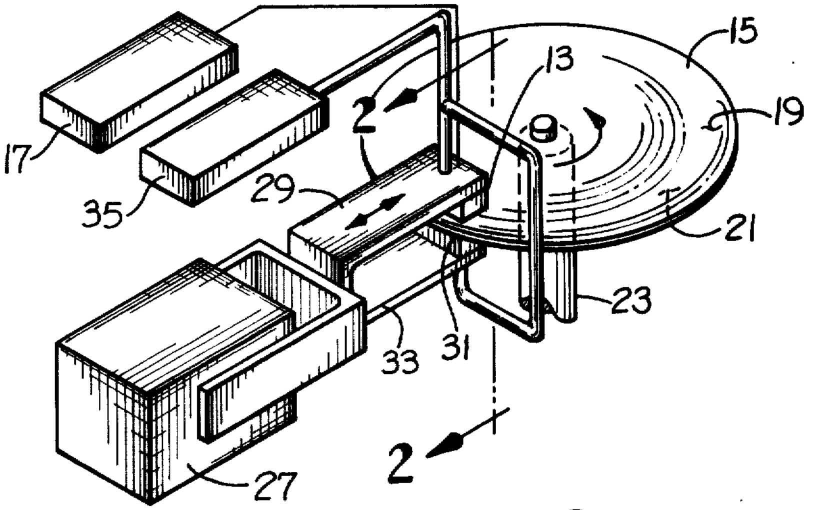
FIG. 1 is a perspective view of the head assembly of the present invention disposed in proximity to a medium for the transduction of signals therebetween.

The head assembly of the present invention is illustrated in FIG. 1 and designated generally by the reference numeral 11. The head assembly 11 includes a head 13 which cooperates with a recording medium 15 to record or reproduce signals between the medium 15 and a signal source/receiver 17. As illustrated in FIG. 1, the medium may have the configuration of a disk. The medium 15, which is typically defined by first and second major surfaces 19 and 21 respectively, may have either rigid or flexible characteristics. The first surface 19, and in some embodiments the second surface 21, of the medium 15 will typically be coated with a magnetizable material.

The head 13 may be either a recording head or a playback head or it may have a dual capability for performing both of these functions. In either case, the head 13 has characteristics for transducing signals between the head 13 and the medium 15, such as the disk illustrated.

The medium 15 and the particular signals associated therewith can be of several types. For example, the medium 15 can have photographic characteristics in which case the signals transduced will typically be optical signals. Ferromagnetic recording devices can also benefit from the features of the present invention.

In a preferred embodiment of the invention, at least the first surface 19 of the medium 15 is coated with a particulate material having characteristics for being oriented on the medium 15 by magnetic flux. In such an embodiment, the signals transduced are magnetic signals. If the head 13 is performing a recording function, electrical signals from the source 17 are converted into magnetic signals by the head 13 and these magnetic signals orient the magnetizable particles on the surface 19 of the medium 15. If the head 13 is performing a playback function, the particular orientation of the particles on the surface 19 produces magnetic signals in the head 13. These magnetic signals are converted into electrical signals which are introduced to the signal receiver.

These magnetic signals are of particular importance in a gap 18 which is defined in the head 13. When the surface 19 is moved in close proximity to the gap 18, the magnetic signals in the gap 18 influence the magnetizable coating on the surface 19 so that the particles of coating are provided with a permanent orientation which is related to the magnetic signals in the gap 18.

In these types of recording systems, the head 13 is moved relative to the medium 15 so that the signal transduced at a particular moment in time is associated with the characteristics of the medium 15 at a particular point on the surface 19. This relative movement is typically accomplished by holding the head 13 stationary and moving the medium 15. The particular method for moving the medium 15 depends upon its configuration. If the medium 15 has the configuration of a tape, it is typically drawn past the head 13 by drive rollers (not shown). In the embodiment illustrated wherein the medium 15 has a disk configuration, the medium 15 can be supported on a rotatable shaft 23.

Due to this relative movement between the head 13 and the medium 15, the head 13 defines on the first surface 19 a track 25. If the magnetizable medium comprises a tape, the relative movement of the head 13 and the medium 15 will be linear so that the track 25 will have a linear configuration. In the embodiment illustrated in FIG. 1 wherein the medium 15 has a disk configuration, the relative movement of the head 13 and the medium 15 is angular so that the track 25 has a circular configuration.

A linear actuator 27 is typically provided to position the head 13 along a path which is oriented in a transverse direction relative to the direction of the track 25 at the head 13. In this manner, a plurality of tracks, concentric with the track 25, are typically defined on the first surface 19. Each of the tracks is associated with a particular position of the linear actuator 27 and hence the head 13 with respect to the medium 15.

There are three types of relationships which exist between the head 13 and the medium 15: electrical, magnetic and mechanical. The electrical and magnetic characteristics have been described above and are generally well known in the prior art. It is the mechanical relationship between the head 13 and the medium 15, such as the magnetizable disk, which is of particular interest to the present invention.

It will be noted that the gap 14 extends into the head 13 so that there is an average separation distance between the gap 14 and the surface 19 of the medium 15. An undesirable reduction in signal strength, which is related to this separation distance, is commonly referred to as a spacing loss. The spacing loss is directly proportional to the average separation distance and inversely proportional to the wavelength of the signal being recorded. Particularly at high frequencies which correspond to a short wavelength, it is desirable to reduce the average separation distance to minimize the spacing loss. Thus in applications wherein high frequency recording is of particular importance, the medium 15 is preferably brought into direct contact with the recording head 13.

In the present invention, this contiguous relationship is facilitated by mounting the head 13 on a rigid arm 29. A pad 31 is similarly positioned on an arm 33 and disposed immediately opposite the head 13 with the medium 15 extending therebetween. The arms 29 and 33 are attached to the movable element of the linear actuator 27 to facilitate the transverse positioning of the head 13 and the pad 31 with respect to the medium 15. With this orientation, the head 13 forms an interface 14 with the surface 19 and the pad 31 forms an interface 16 with the surface 21 of the medium 15.

Figure 2:
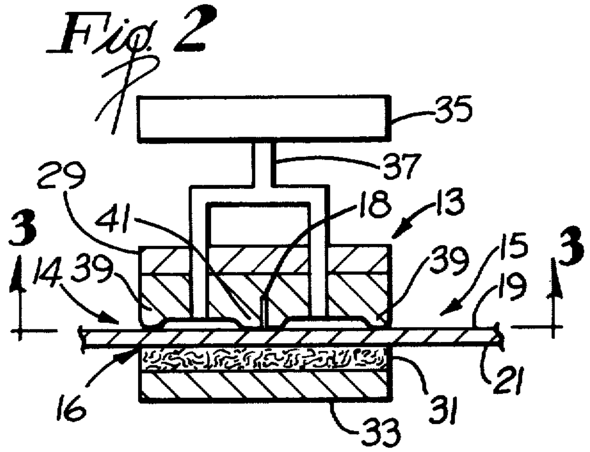
FIG. 2 is a cross-sectional view of one embodiment of the head assembly taken on lines 2—2 of FIG. 1 and illustrating a fluid biased head.
Figure 3:
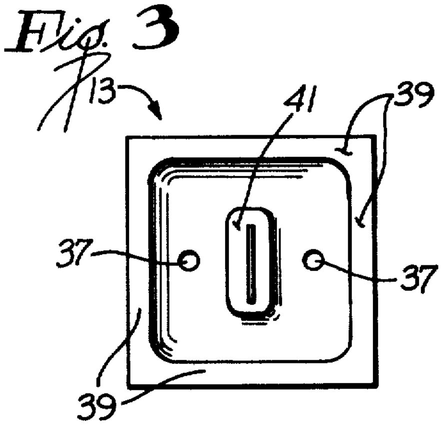
FIG. 3 is a bottom plan view of the fluid biased head illustrated in FIG. 2.

It is desirable that the pad 31 be biased to force the medium 15 against the head 13. This can be accomplished by many methods known in the prior art. In the preferred embodiment, the arm 33 is spring biased so that the pad 31 exerts a normal force on the surface 21 to press the surface 19 into contact with the head 13. In the embodiment such as that illustrated in FIG. 2, the pad 31 can be formed from felt or a similar compliant material.

Although the contiguous relationship between the head 13 and the medium 15 is desirable to minimize the spacing loss, friction forces are developed which are directly proportional to the normal force exerted by the pad 31. In the prior art, these friction forces have significantly reduced the life of both the head 13 and the medium 15 as previously explained.

In the present invention, a fluid source 35 provides a fluid, such as air, which is introduced at a first pressure through a conduit 37 and into the interface 14. Since the fluid is preferably not introduced across the perimeter of the interface 14, the head 13 can define the terminal portions of the conduit 37. In the interface 14, the pressurized fluid produces a first force which tends to displace the medium 15 from the head 13. As long as the first force does not exceed the normal force created by the bias on the pad 31, the medium 15 will be maintained in contact with the head 13. However the friction force which creates the wear on the head 13 and the medium 15 will be reduced by the magnitude of the first force. This contiguous relationship with a reduced friction force is of significant advantage in extending the life of the head 13 and medium 15.

At the interface 14, the head 13 can be provided with shoulders 39 which extend at the edges of the head 13 to define the perimeter of the interface 14. A shoulder 41 which defines the gap 18 extends from the central regions of the interface 14 to define with the shoulders 39 a plane which is usually the plane of the surface 19.

As used herein, the interface 14 relates to that area between the head 13 and the surface 19 which is exposed to the pressure of the fluid from the source 35. Thus the interface 14 is defined between those portions of the head, such as the shoulders 39, 41, which extend to contact the surface 19.

The area of the interface 14 is of particular importance to the present invention since the force of the fluid on the surface 19 is theoretically equal to the first pressure times the area of the interface 14.

In a preferred embodiment, the perimeter of the interface 14 is defined by the shoulders 39. This perimeter may have the configuration of a square having sides approximately two-tenths of an inch in length. If the shoulder 41 extends to contact the surface 19, the area of the interface 14 is equal to the square area defined by the shoulders 39, minus the area of the shoulder 41.

In a preferred embodiment wherein the area of the shoulder 41 is approximately 0.005 square inches, the area of the interface is approximately 0.040 square inches. If the fluid has a first pressure which is equal to 2 psi, an interface 14 having this area will produce a first force of approximately 0.07 pounds on the medium 15. In an embodiment wherein the normal force created by the bias on the pad 31 is approximately 0.08 pounds, a first force of this magnitude is less than the normal force. Under these desirable conditions, the medium 15 is maintained in contact with the head 13.

By providing for the extension of the shoulders 39 and 41 to contact the surface 19, the shoulders 39, 41 define pockets within which the fluid can circulate to equalize the pressure throughout the interface 14.

A highly desirable feature of the present invention is associated with the self-cleaning characteristics of the head 13. When the medium 15 is moved relative to the head 13, the air in contact with the moving element is provided with a laminar flow which creates a pressure which decreases in magnitude with increasing positions from the moving surface. Advantage has been taken of these hydrodynamic effects to support the weight of the stationary element to displace the head 13 from the medium 15.

While this concept of a "flying head" has increased the life of the head and the medium, it has also provided a flow of air into the interface between the head and the medium. With this flow of air, dust and other foreign objects have been carried into the interface. These particles have not only scored the surface of the head and the medium but have also resulted in high speed contact between the head and the medium. This typically results in destruction of a portion of the magnetic surface, such as the surface 19 with a consequent loss of the data recorded thereon. This phenomenon which is commonly referred to as "head crash" has also severely damaged the head.

Figure 7:
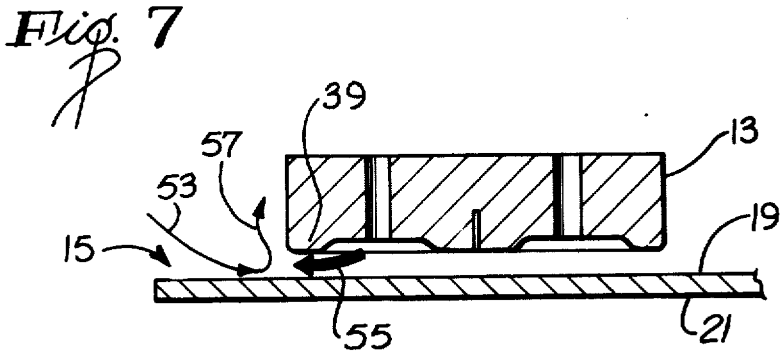
FIG. 7 is an elevational view of the head assembly illustrating the self-cleaning characteristics of the head.

In the present invention, the hydrostatic pressure of the fluid at the perimeter of the interface 14 is greater than the hydrodynamic pressure of the laminar flow which is tending to enter the interface 14. Thus any air crossing the perimeter of the interface 14 at the shoulders 39 is moving outwardly of the interface 14. This "self-cleaning" concept is illustrated in FIG. 7 wherein the hydrodynamic effects are characterized by the narrow arrow 53 and the hydrostatic effects are characterized by the broad arrow 55. With the first fluid providing a higher pressure interiorly of the shoulders 39, the hydrodynamic laminar flow including the foreign particles is turned away from the interface 14 as shown by the arrow 57. In this manner, the hydrodynamic effects created by the relative movement between the head 13 and the medium 15 can be damped by the hydrostatic effects created by the pressurized fluid introduced to the interface 14, so that the interface 14 is maintained free of foreign particles.

In another embodiment of the invention, the pad 31 is formed from a rigid material such as aluminum. The sides of the pad 31 extend to form shoulders 47 which define the perimeter of the interface 16.

A second fluid such as air can be introduced at a second pressure from the source 35 through a conduit 49 and the pad 31 into the interface 16. At the interface 16, the second pressure produces a second force which tends to separate the medium 15 from the pad 31.

The area of the interface 16 is of particular importance to the present invention. Theoretically, the second pressure times the area of the interface 16 is equal to the second force. If the second force at the interface 16 is greater than the first force at the interface 14, the medium 15 will be held in contact with the head 13. Thus, if the second pressure times the area of the interface 16 is greater than the first pressure times the area of the interface 14, the surface 19 will be held in contact with the gap 18 to minimize the spacing loss.

It should also be noted that the fluid at the interface 16 also produces a force equal in magnitude to the second force which opposes the bias of the arm 33 on the pad 31. It follows that if the magnitude of the second force is greater than the biasing force, the pad 31 will be held in spaced relationship with the surface 21 of the medium 15. This feature is of particular importance to the present invention since there are no friction forces between the pad 31 and the medium 15. This highly desirable advantage is achieved without reducing the capability of the pad 31 to maintain the medium 15 in contact with the head 13. Furthermore, this concept of introducing a fluid into an interface between a pad and a medium can be of advantage even in those head assemblies which use conventional heads.

In the past, the second surface of the medium, such as the surface 21, has typically been provided with a very smooth texture to minimize the coefficient of friction between the pad and the medium. It has not been desirable to record signals on the second surface since the magnetizable coating for performing this function would have a very high coefficient of friction with the pad. This would severely limit the useful life of both the pad and the medium and would soon result in the destruction of any information recorded on the surface contacting the pad.

In the present invention wherein the pad 31 does not contact the surface 21, the coefficient of friction is of no particular importance. Thus the surface 21 can be provided with magnetizable coating and the medium 15 can be overturned so that signals are recorded on both the first and second surfaces 19 and 21 respectively. This will provide a significant advantage, of course, since the amount of information that can be recorded on the medium 15 will be doubled.

When the pad 31 is displaced from the surface 21, small gaps are formed between the shoulders 47 and the surface 21 at the perimeter of the interface 16. These gaps permit the escape of a portion of the second fluid so that the pressure of the fluid at the interface 16 is reduced. With a reduction in the second pressure, the second force is proportionately decreased. Since the biasing force provided by the arm 33 is substantially constant, the pad 31 tends to move toward the medium 15. This reduces the size of the gap between the shoulders 47 and the surface 21 and thereby tends to increase the second pressure. It can be seen that the pad 31 ultimately achieves a position of equilibrium where the magnitude of a second pressure provides a second force which is equal to the magnitude of the biasing force.

In a further embodiment of the invention, the conduit 37 and a conduit 49 are combined to receive portions of a single fluid from a conduit 51. Of course it follows that in this embodiment the first and second pressures are equal. This feature which minimizes the structure of the head assembly 11, is of significant advantage to the present invention. As discussed with relation to the previous embodiment, if the second pressure times the area of the interface 16 is greater than the first pressure times the area of the interface 14, the desirable contiguous relationship between the medium 15 and the head 13 will be achieved. In the present embodiment wherein the first and second pressures are substantially equal, this same result can be achieved without regard for the pressure of the fluid by controlling the area of the interface 16 with respect to the area of the interface 14.

In a preferred embodiment, the perimeter of the interface 16 has the same dimensions as the perimeter of the interface 14. Thus the interface 45 can be substantially two-tenths of an inch square. However, whereas the area of the interface 14 is reduced by the area of the shoulder 41, there is no such reduction in the area of the interface 16. It can now be appreciated that in an embodiment wherein the first and second pressures are equal and the dimensions of the perimeters of the interfaces 14 and 16 are also equal, the force at equilibrium of the medium 15 against the head 13 will be substantially proportional to the area of the shoulder 41.

These forces have other relationships which are of particular advantage to the present invention. It was initially noted that the medium 15 could be flexible as well as rigid. Magnetic disks with rigid characteristics have been provided with substantially planar surfaces. With a planar surface, it has been possible to support the magnetic head on the laminar air flow and thereby theoretically avoid contact between the head and the medium. In the case of flexible disks, this means for avoiding friction forces has been achieved by holding the head in a fixed position and allowing laminar flow to cause the disk to contour itself around the head. This technique is practical only at high head/medium velocity and is critically dependent upon the homogeneity of the medium.

In the present invention it will be noted that the first and second forces at the interfaces 14 and 45 respectively can have significant magnitudes which tend to pinch the medium 15 where it is in proximity to the head 13. Thus at the point where the surface 19 contacts the gap 18, even a flexible medium can be provided with the desirable planar configuration. Furthermore, this planar configuration is achieved without increasing the wearing or friction forces on the medium or the head 13.

These embodiments of the invention have been described with primary emphasis upon their equilibrium states. It will now be noted that the embodiments illustrated in FIGS. 4 and 6, which include the pneumatic pad 31, are of particular advantage under dynamic conditions. Consider for example the dynamic conditions under which the medium 15 undesirably moves from contact with the head 13. With regard only to the mechanical relationships in the head assembly 11, this separation of the head 13 and the medium 15 will have two effects. First, the size of the gap between the shoulders 47 and the surface 21 will be decreased so that the second pressure will increase. This increase in the second pressure will provide a proportionate increase in the magnitude of the second force thereby tending to move the medium 15 back into contact with the head 13.

Figure 4:
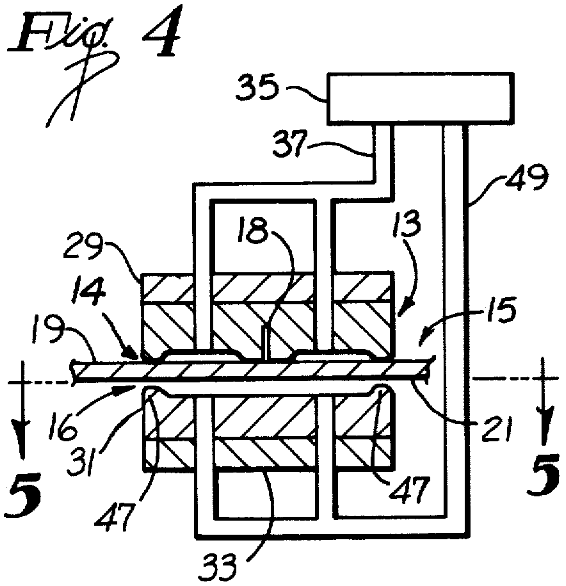
FIG. 4 is a cross-sectional view taken on line 2—2 of FIG. 1 and illustrating a head and associated pad respectively biased by a first fluid and a second fluid.
Figure 5:
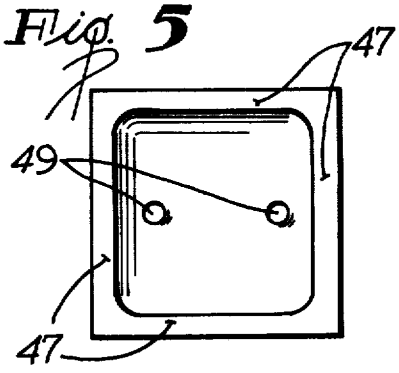
FIG. 5 is a top plan view of the pad illustrated in FIG. 4.

If the head assembly 11, such as that shown in FIG. 4, includes a pneumatic head 13 rather than a conventional head, the displacement of the medium 15 from the head 13 will produce a second effect. A gap will be formed between the shoulders 39 and the surface 19 of the medium 15. This gap will reduce the first pressure at the interface 14 which will result in a proportionate decrease in the magnitude of the first force. This will also tend to return the medium 15 into contiguous relationship with the head 13.

Figure 6:
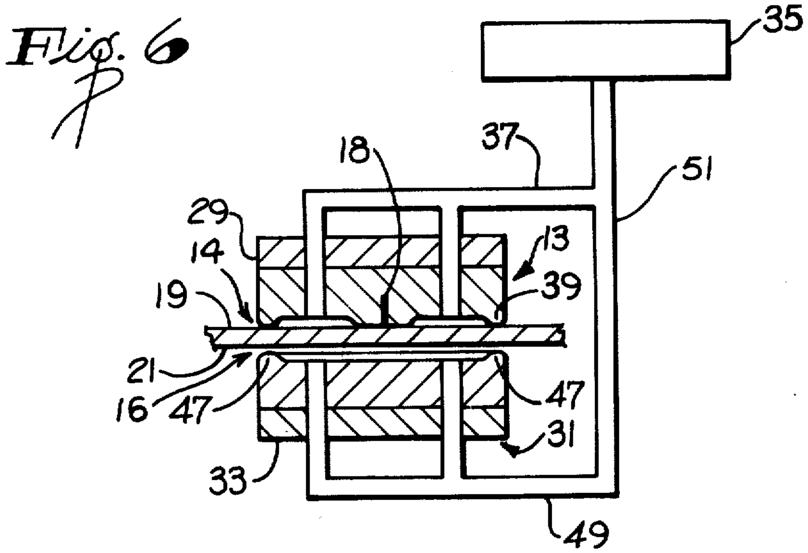
FIG. 6 is an embodiment of the head assembly similar to that illustrated in FIG. 4 wherein the first and second fluids have substantially equal pressures.

If the first and second pressures are substantially equal as in the embodiment illustrated in FIG. 6, an even further advantageous effect will result under these dynamic conditions. When the first pressure is reduced with the formation of the gap between the shoulders 39 and the surface 19, the second pressure will also be reduced. This reduction in the second pressure will provide a proportionate decrease in the second force so that the bias of the arm 33 tends to move the pad 31 toward the medium 15. If the magnitude of the second force is sufficiently reduced, the bias on the arm 33 will force the pad 31 against the medium 15 and will press the medium 15 back into contact with the head 13. At this point the magnitude of the first pressure, and hence the magnitude of the second pressure, will increase and the second force will again displace the pad 31 from the medium 15. Thus in the embodiment illustrated in FIG. 6, the size of the gap between the shoulders 47 and the surface 21 which is initially reduced by movement of the medium 15 toward the pad 31, is further reduced by movement of the pad 31 toward the medium 15. It follows that this embodiment of the head assembly 11 is particularly responsive to these dynamic conditions.

Although the invention has been described with reference to particular embodiments and particular fluids, pressures and areas in these embodiments, it will be apparent that this concept of a fluid biased head assembly can be otherwise embodied. For this reason, the scope of the invention should be ascertained only with reference to the following claims.

We claim:

1. A head assembly for recording a signal on a medium, including:

a head disposed in recording relationship with the medium and responsive to the signal to alter the characteristics of the medium;

first means disposed opposite the head for maintaining the medium in a substantially contiguous relationship with the head;

second means for biasing the first means in the direction of the medium; and third means for introducing a fluid between the first means and the medium, the fluid having properties for opposing the bias of the second means on the first means to maintain the first means in a substantially frictionless relationship with the medium.

2. The head assembly recited in claim 1 wherein:

the second means produces a first force on the first means tending to move the first means toward the medium;

the fluid introduced by the third means produces a second force on the first means; and the magnitude of the second force is greater than the magnitude of the first force so that the first means is maintained in a substantially frictionless relationship with the medium.

3. The head assembly recited in claim 2 wherein the fluid is a first fluid and the second force also tends to move the medium toward the head, the assembly further comprising:

fourth means for introducing a second fluid between the medium and the head, the second fluid producing a third force tending to move the medium away from the head; and the second force has a magnitude greater than the third force so that the medium is maintained in a substantially contiguous relationship with the head.

4. A head assembly for transducing signals between the head assembly and a medium having a first major surface and a second major surface, comprising:

a head disposed to define with the first major surface of the medium a first interface having a first area;

a pad disposed opposite the head to define with the second major surface of the medium a second interface having a second area at least as large as the first area; and means for introducing a fluid into the first interface and the second interface, the fluid having a pressure producing a first force on the first major surface of the medium and producing a second force on the second major surface of the medium, the first force having a magnitude dependent upon the first area and the second force having a magnitude dependent upon the second area, and the magnitude of the second force being at least as great as the magnitude of the first force to maintain the medium in a substantially contiguous relationship with the head.

5. A head assembly for transducing magnetic signals between the head assembly and a medium movable relative to the head assembly, comprising:

a head defining with the medium an interface having a central area surrounded by a peripheral area, the signals being transduced across the interface between the head and the medium;

first means for introducing into the central area of the interface a fluid having a first pressure providing a first force which tends to separate the head and the medium and tends to provide a flow of the fluid outwardly of the interface across at least a portion of the peripheral area to inhibit the flow of foreign particles into the interface; and second means disposed opposite the head with the medium relatively movable between the head and the second means, the second means having characteristics for providing a second pressure on the medium which opposes the first pressure on the medium to maintain the medium in contact with the head.

6. The head assembly recited in claim 5 wherein the medium is flexible and the first and second pressures maintain the medium in a substantially rigid configuration in proximity to the head.

7. A head assembly for recording a signal on a medium, including:

a head disposed in recording relationship with the medium and being responsive to the signal to alter the characteristics of the medium;

a pad disposed on the side of the medium opposite the head and having a substantially frictionless relationship with the medium;

first means providing a first force on the pad and tending to maintain the medium in a contiguous relationship with the head; and second means for introducing a fluid into the region between the pad and the medium, the fluid having a pressure producing a second force opposing the first force and tending to maintain the pad in the substantially frictionless relationship with the medium.

8. The head assembly recited in claim 7 wherein:

the first force increases in magnitude with increasing positions of the pad from the medium; and the second force is substantially equal to the first force during operation of the head assembly.

9. The head assembly recited in claim 7 wherein the fluid introduced by the second means is a first fluid, the pressure of the first fluid is a first pressure, and the assembly further comprises:

third means for introducing a second fluid into the region between the head and the medium, the second fluid having a second pressure producing a third force tending to move the medium away from the head; wherein the magnitude of the second force is generally greater than the magnitude of the third force so that the medium is normally held in contiguous relationship with the head.

10. The head assembly recited in claim 9 further comprising:

means for connecting the second means and the third means to provide the first pressure with the same magnitude as the second pressure; whereby separation of the medium from the head reduces the magnitude of the second force and the third force so that the first force tends to return the medium to the contiguous relationship with the head.

11. A head assembly for recording signals on a medium having first and second major surfaces and generally flexible characteristics, comprising:

a head disposed in contiguous relationship with a first major surface of the medium and including portions defining with the first major surface a first cavity;

a pad disposed opposite the head and relative to the second major surface of the medium, the pad having portions defining with the second major surface a second cavity;

means for biasing the pad in the direction of the medium to maintain the medium in the contiguous relationship with the head;

means for introducing a first fluid into the first cavity to reduce the pressure of the medium on the head; and means for introducing a second fluid into the second cavity to oppose the force of the biasing means on the pad and to maintain the pad in a frictionless relationship with the medium.

12. The head assembly recited in claim 11 wherein the pressure of the first fluid is substantially equal to the pressure of the second fluid.

13. The head assembly adapted for use with a recording medium defined by first and second major surfaces and having generally flexible characteristics, the recording medium being movable to bring different regions of the medium into a preselected zone, comprising:

a head having a contiguous relationship with the region of the medium in the preselected zone and properties for recording the signal on the medium as the regions of the medium are moved through the preselected zone; and first means cooperating with the head for introducing a fluid under pressure onto the first and second major surfaces of the medium at the preselected zone to provide the regions of the medium in the preselected zone with a substantially constant configuration with respect to the head.

14. The head assembly set forth in claim 13 wherein the first interface is defined in part by a perimeter having a leading edge and the fluid flows outwardly of the first interface across the leading edge of the perimeter to oppose the flow of foreign objects across the perimeter inwardly of the first interface to provide for self-cleaning of the first interface.

15. The head assembly set forth in claim 13 wherein the first means includes:

a first fluid introduced through the head into the first interface to exert a first fluid pressure on the medium at the preselected zone;

a second fluid introduced through the pad into the second interface to exert a second fluid pressure on the medium at the preselected zone; and the first fluid and the second fluid being directed to impinge on opposite surfaces of the medium so that the medium in the preselected zone is pinched to provide the medium with a substantially constant configuration in proximity to the head.

16. A head assembly adapted for use in transducing signals between the head assembly and a flexible medium having first and second major surfaces, the assembly being adapted for use with a source of pressurized fluid and comprising:

a head defining with the first major surface of the medium an interface across which the signals are transduced;

first means cooperating with the head for conducting a first fluid from the source of pressurized fluid into impinging relationship with the first surface of the medium;

second means for conducting a second fluid from the source of pressurized fluid into impinging relationship with the second major surface of the medium; and the first and second fluids having pressures which provide the medium with a substantially constant configuration in proximity to the head and which produce opposing hydrostatic forces which tend to maintain the medium in contact with the head.

17. The head assembly recited in claim 16 wherein the interface is characterized by a perimeter defining a central area of the interface and wherein the first fluid provides at the perimeter a pressure inhibiting flow of fluid across the perimeter into the central area, whereby foreign particles are inhibited from moving into the central area of the interface.

18. The head assembly recited in claim 16 wherein the flexible medium is movable relative to the head to provide hydrodynamic forces which tend to separate the head from the medium and wherein the hydrostatic forces produced by the first and second fluids tend to dampen the hydrodynamic forces so that the head is maintained in a substantially constant relationship with the medium.

19. A head assembly for transducing signals between the head assembly and a medium having a first major surface and a second major surface, comprising:

a head disposed to define with the first major surface of the medium a first interface having a first area;

first means disposed opposite the head to define with the second major surface of the medium a second interface having a second area substantially equal to the first area, the first means having properties for introducing into the second interface a first fluid having a first pressure producing a first force tending to move the first major surface into contact with the head;

second means cooperating with the head for introducing into the first interface a second fluid having a second pressure and producing a second force tending to move the medium out of contact with the head; wherein the first force is greater than the second force so that the medium is maintained in contiguous relationship with the head.

20. The head assembly set forth in claim 19 wherein the product of the first pressure and the area of the second interface exceeds the product of the second pressure and the area of the first interface.

21. The head assembly recited in claim 19 wherein the first pressure is substantially equal to the second pressure and the ratio of the first force to the second force is substantially constant.

22. The head assembly recited in claim 19 wherein the second fluid flows outwardly of the first interface and the second fluid flows outwardly of the first interface to provide for the self-cleaning of the first interface.

23. In combination:

a recording medium having first and second major surfaces and generally flexible characteristics;

first means for removably supporting the recording medium and for moving the recording medium through a preselected zone;

second means disposed at the preselected zone for introducing a first fluid into impinging relationship with the first major surface, the first fluid having a pressure producing a first force on the medium;

third means disposed at the preselected zone for introducing a second fluid into impinging relationship with the second major surface of the medium, the second fluid having a pressure producing a second force opposing the first force on the medium;

the first and second forces tending to stabilize the medium to provide the medium with a substantially constant configuration in the preselected zone; and a head disposed in the preselected zone and in contiguous relationship with the medium, the head having characteristics for transducing signals between the medium and the head.

24. The combination recited in claim 23 wherein:

the head is disposed in contiguous relationship with the first major surface of the medium; and the second force is greater than the first force so that the medium is maintained in the contiguous relationship with the head.

25. The combination recited in claim 23 wherein the third means includes:

a pad disposed relative to the second major surface of the medium;

means for biasing the pad to produce a third force tending to move the pad in the direction of the medium;

portions of the pad introducing the second fluid through the pad to produce the second force tending to move the pad away from the medium force; whereby the second force opposes the third force to maintain the pad in a spaced relationship with the medium.

* * * * *